UNITED STATES PATENT OFFICE.

MARCUS MARX, OF BROOKLYN, NEW YORK.

COMPOSITION FOR BRICKS, TILES, &c.

SPECIFICATION forming part of Letters Patent No. 362,759, dated May 10, 1887.

Application filed January 20, 1887. Serial No. 224,834. (No specimens.)

*To all whom it may concern:*

Be it known that I, MARCUS MARX, of the city of Brooklyn, Kings county, and State of New York, have invented a new and useful Improvement in Compositions for the Manufacture of Bricks, Tiles, Pipes, &c., of which the following is a specification.

My invention relates to a composition of matter for the manufacture of bricks, tiles, pipes, conduits, and for all other purposes for which a light, strong, hard, fire and water proof, non-conducting compound, easily molded into any desired shape, may be usefully applicable.

My invention consists more particularly in a composition containing principally infusorial earth combined with a vitrifiable substance, which acts as a binding material, and also, if desired, with an organic substance, or with clay, or with both.

I prepare my aforesaid composition by first reducing the infusorial earth to a finely comminuted or pulverulent state. With this I mix magnesia, borax, or other suitable vitrifiable substance in sufficient quantity to combine when fused with the mass, and firmly bind the whole together. Thus I may employ about nineteen parts of said infusorial earth to one part of vitrifiable material. These ingredients are mixed with water to a plastic and easily-molded state. When the infusorial earth is naturally of a very dry and friable nature and contains but a small percentage of clay, it is desirable to mix a certain amount of clay with it, so as to render it more cohesive; but as clay adds to the weight of the resulting compound, too large a percentage thereof should be guarded against. I find it advantageous to employ, say, fifteen parts of infusorial earth, four parts of clay, and one part of vitrifiable material. Finally, in order to increase the lightness of the mass, I may add to it a small amount of organic material—such as fine sawdust—in the proportion of, say, two parts. I wish it understood, however, that I do not limit myself to the precise quantities of the ingredients before mentioned, because these will necessarily vary in accordance with the uses for which the article to be made from my composition is to be devoted. The basis of the composition is infusorial earth and vitrifiable material. To give it weight and solidity, and to increase its cohesiveness, clay is added. On the other hand, to augment its lightness, organic material is added. The plastic mass, after being molded into the desired form, is baked in any suitable kiln or oven at a heat sufficient to vitrify the vitrifiable material. The glass resulting from such vitrification permeates the compound, binding all its particles firmly together into a hard coherent mass. The organic material is either carbonized, and so greatly reduced in bulk, or is wholly expelled, the consequence being that the mass is left porous.

The practical advantages of this composition are very numerous. It is fire-proof and water-proof. It is a non-conductor both of heat and electricity. It deadens sound. It is hard and strong. It resists all ordinary acids and the effects of the weather. It may therefore be used for building-bricks or in any of the various shapes, solid or hollow, now employed for the filling between floors, partitions, or walls of buildings. It will serve excellently for the manufacture of conduits for the reception of electrical conductors, either above or below ground. It may be used in the form of tiles for flooring or roofing. It may be molded into architectural ornaments of massive appearance, yet of very light weight. It is an excellent covering for floors or pavements in place of cements and concretes, or as a stucco for the exterior of walls. Finally, as infusorial earth is widely distributed in great abundance, it is cheap, while no especial skill is required in the manufacture of the composition.

I claim—

1. A composition containing infusorial earth and a vitrifiable substance, as and for the purposes set forth.

2. A composition containing infusorial earth, a vitrifiable substance, and clay, as and for the purposes set forth.

3. A composition containing infusorial earth, a vitrifiable substance, and an organic substance, as and for the purposes set forth.

4. A composition containing infusorial earth, a vitrifiable substance, clay, and an organic substance, as and for the purposes set forth.

5. A composition containing infusorial earth, clay, and magnesia, substantially as described.

6. A composition containing infusorial earth, magnesia, and sawdust, substantially as described.

7. A composition containing infusorial earth, magnesia, clay, and sawdust, substantially as described.

8. As a new article of manufacture, a fictile article—such as a brick or tile—formed of a composition consisting chiefly of infusorial earth agglutinated by a vitrified binding material, substantially as described.

MARCUS MARX.

Witnesses:
 D. H. DRISCOLL,
 EDGAR GOODWIN.